Patented Oct. 22, 1946

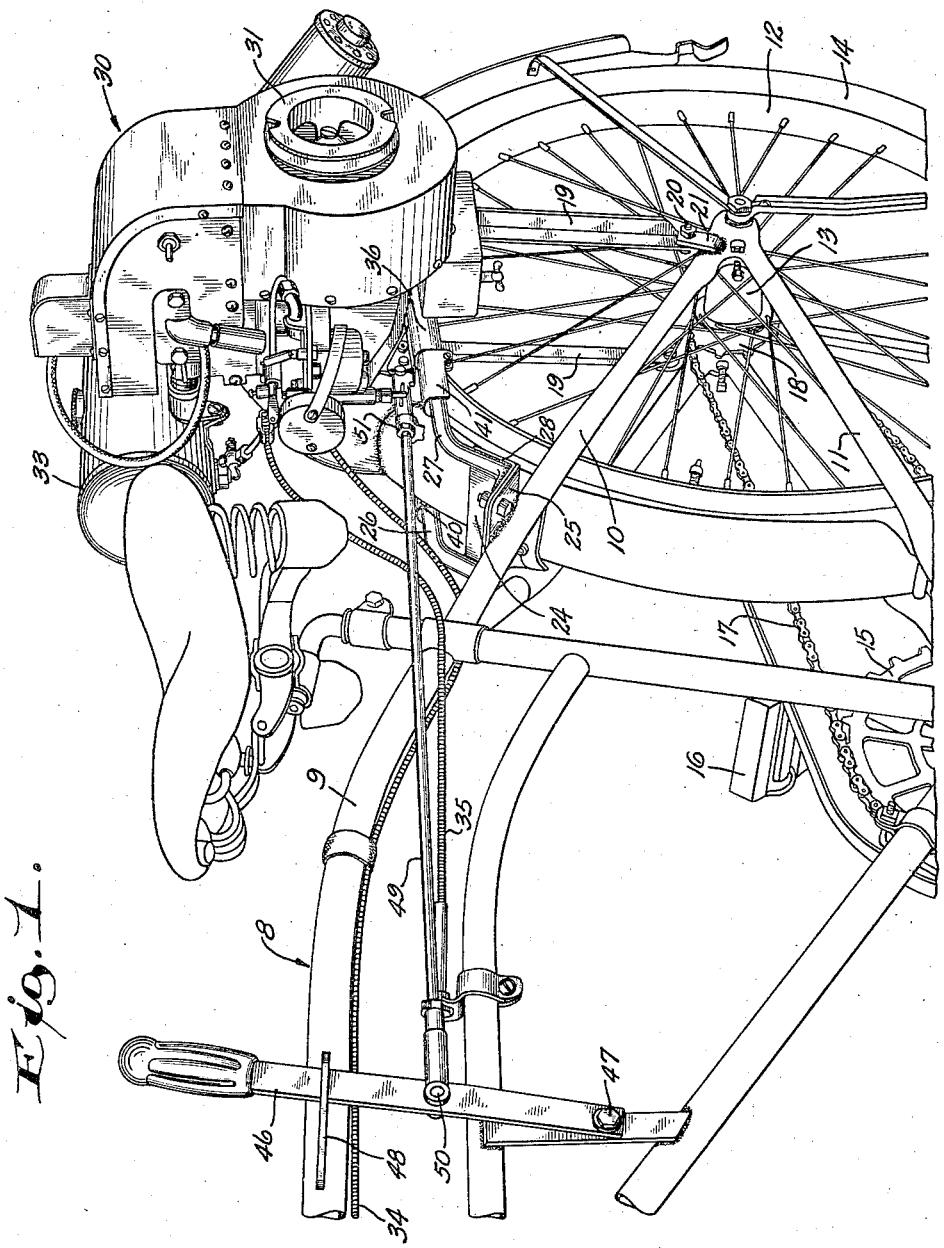

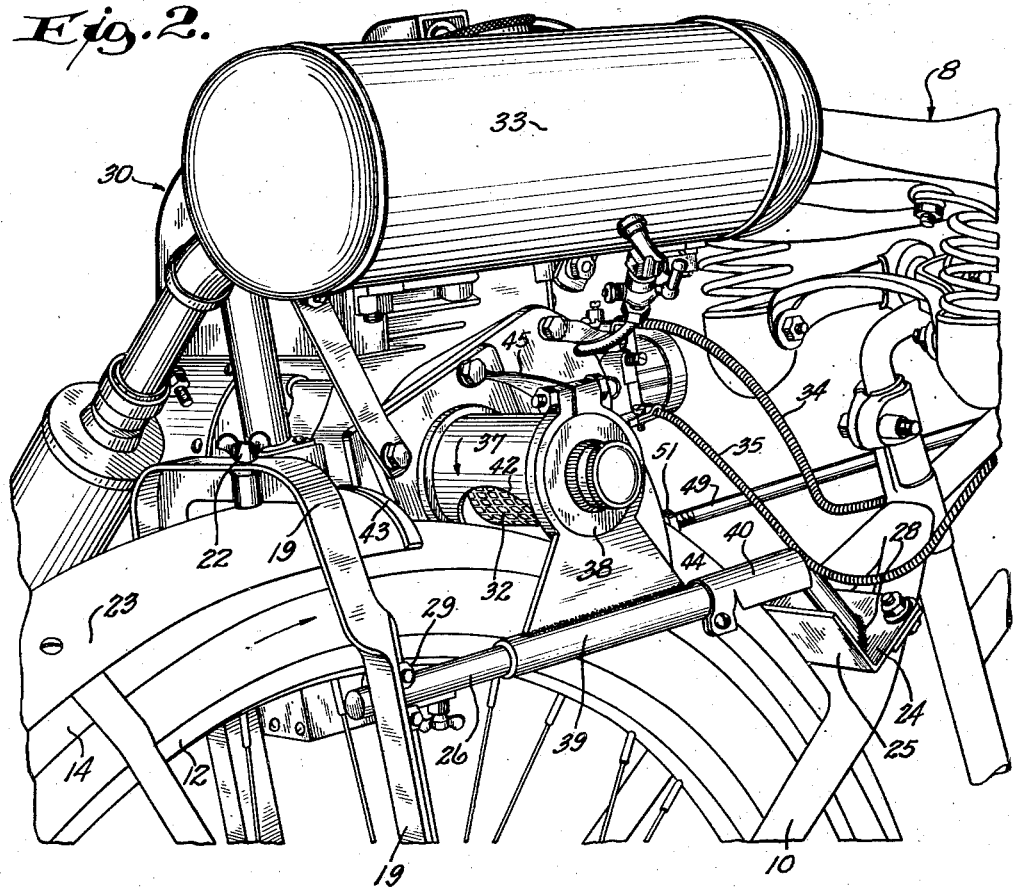

2,409,887

UNITED STATES PATENT OFFICE 2,409,887

MOTOR BICYCLE

George F. Murphy, Milwaukee, Wis.

Application December 29, 1943, Serial No. 516,045

5 Claims. (Cl. 180—33)

This invention relates to improvements in motor bicycles.

In that adapation of the motor bicycle wherein the motor is mounted adjacent to the upper portion of the rear wheel, and wherein the drive is effected by a motor driven friction pulley which engages the tire, considerable difficulty has been encountered in obtaining and maintaining a uniform and efficient driving engagement. In many of these devices the weight of the motor is relied upon to maintain the friction pulley in proper contact with the tire. In other devices there are springs or other mechanisms to urge the pulley into engagement. In all of these structures, however, the friction pulley is movable from a position above the tire to a lowered position in contact with the highest portion of the tire periphery. As a result, any unevenness in the road which causes the rear wheel to bounce up and down effects the driving engagement. These variations in pressure of the pulley against the tire cause inefficient operation and excessive wear on the tire.

It is a general object of the present invention to provide an improved motor bicycle wherein the motor and driving unit are mounted in a novel manner to obviate the above-mentioned objections and to positively prevent the driving pulley from bouncing upwardly out of proper engagement with the tire.

A further object of the invention is to provide a construction as above described wherein the driving pulley is mounted for engagement with the tire at a point forwardly of and below an horizontal tangent with the uppermost portion of the tire, said pulley being movable in a generally horizontal direction to effect a driving engagement. Thus, as the pulley rotates in a driving direction it has a continual tendency to climb on the tire toward driving engagement.

A more specific object of the invention is to provide a construction as above described wherein the motor and driving pull are so supported on the rear frame portion, preferably on the rear fork of the bicycle, as to be slidable in a generally horizontal direction into and out of driving engagement.

Other objects of the invention are to provide a motor bicycle which is constructed to relieve the bicycle frame from undue strains; which has a conveniently located hand lever for controlling the engagement between the friction pulley and tire; which can be efficiently operated in traffic where frequent stops are necessary; which is relatively inexpensive to manufacture and operate; and which is otherwise well adapted for the purpose described.

With the above and other objects in view the invention consists of the improved motor bicycle and all its parts and combinations as set forth in the claims and all equivalents thereof.

In the accompanying drawings illustrating a preferred embodiment of the invention, in which the same reference numerals designate the same parts in all of the views:

Fig. 1 is a fragmentary perspective view showing one of the rear side portions of the motor bicycle; and Fig. 2 is a fragmentary perspective view looking at the opposite rear side portion from Fig. 1.

Referring more particularly to the drawings the bicycle 8 is generally of standard construction and includes a frame 9 having an upper rear fork 10 and a lower rear fork 11, a rear wheel 12 equipped with a coaster brake 13 and a rear tire 14. In addition there is the usual sprocket wheel 15 and operating pedals 16 for transmitting rotation through a chain 17 to the rear wheel sprocket 18.

Supported on the rear end portion of the fork 10 is a U-shaped auxiliary supporting member 19. The lower ends of this supporting member are connected by nuts and bolts 20 to lugs 21 on the rear fork portion 10. The upper portion of the member 19 may be connected by a nut and bolt 22 with the rear mud guard portion 23 (see Fig. 2).

Suitably connected to the forward portion of the fork member 10 is a plate 24 having an angularly extending flange 25. Rods 26 and 27 have their forward portions bent downwardly and rigidly secured to the plate portions 24 and 25 by means of welding or the like as at 28. These rods project rearwardly in a direction which generally extends longitudinally of the bicycle and the rearward ends are connected to the auxiliary supporting member 19 by means of U-bolts 29 or other suitable fastenings. While the rods 26 and 27 extend in a generally horizontal direction they nevertheless incline slightly downwardly in a rearward direction as is clear from Fig. 2.

An internal combustion engine 30 is equipped with the usual crank shaft and this crank shaft extends transversely of the bicycle. On one end of the crank shaft is a starting rope pulley 31, and rigidly mounted on the other end of the crank shaft is a tire-engaging friction pulley 32. The friction pulley may be formed with a roughened periphery so as to provide a better driving engagement with the tire 14. A fuel tank 33 may be supported on the upper portion of the motor. The throttle and choke may be controlled by the usual wires extending through flexible cables 34 and 35 and said cables may lead to a convenient location on the forward portion of the bicycle.

Rigidly secured to the motor on one side of the rear wheel 12 is a sleeve 36 and this sleeve is slidably supported on the rod 27 (see Fig. 1). On the other side of the wheel and projecting downwardly from the housing 37 for the friction pulley 32 is a bracket 38 having a sleeve 39 rigidly connected to its lower edge. The sleeve 39 is slidable on the rod 26. The forward end of each of the sleeves may be equipped with a shield to prevent mud or the like from getting on the rods to interfere with proper sliding of the sleeves 36 and 39 on the rods 27 and 26. These shields are designated by the numerals 40 and 41.

The lower portion of the housing 37 for the friction pulley 32 is cut out as at 42 to permit a direct engagement between the tire and the friction pulley 32. In addition, the rear portion 23 of the mud guard terminates as at 43 and the forward portion 44 of the mud guard is bent upwardly as at 45 to project over the forward portion of the friction pulley housing 37.

It is apparent that the entire motor and associated parts are supported on the two sleeves 36 and 39 and that the two sleeves in turn are supported on the longitudinally extending rods 26 and 27. The motor is so supported that the friction pulley extends transversely over the tire in the space between the two mud guard portions 23 and 44. When the sleeves 36 and 39 are in the position shown in Fig. 2 the friction pulley is out of engagement with the tire. However, by sliding the sleeves in a rearward direction on the rods 26 and 27 the friction pulley 32 is moved into engagement with the tire at a point forwardly of and below a horizontal tangent with the uppermost portion of the tire.

The movement of the motor unit into and out of driving engagement is accomplished by a hand lever 46 (see Fig. 1) which is pivoted to the bicycle frame as at 47. The upper portion of the lever moves in a slot in a bracket 48. An actuating rod 49 has its forward end pivotally connected to the lever as at 50 and has its rear end adjustably connected to the motor unit as at 51. When the hand lever is pushed to the position of Fig. 1, the friction pulley is in engagement with the tire. When the hand lever is pushed forwardly from the position of Fig. 1, then the sleeves 36 and 39, together with the motor and driving pulley supported thereon, are pulled forwardly, sliding on the rods 26 and 27 to the position of Fig. 2.

During use of the bicycle the motor may be started by the use of a starting rope wound around the starting pulley 31 while the friction pulley is out of engagement with the tire; or the motor may be started by leaving the friction pulley in engagement with the tire and by pedaling the bicycle. When it is desired to bring the moving bicycle to a stop the hand lever 46 is pushed forwardly to disengage the friction pulley from the tire and the motor is throttled down to idling speed. The usual coaster brake 13 is also employed to aid in the stop. When it is desired to start up again in traffic the hand lever is moved rearwardly to bring the friction pulley into engagement with the tire and the motor is accelerated.

Due to the novel mounting of the motor and driving pulley, it is apparent that the motor and pulley are positively maintained against movement in a vertical direction away from the tire. Such movement usually occurs due to bouncing on an uneven road. Due to the fact that the motor and driving pulley are movable in a direction longitudinally of the bicycle to effect a driving engagement with the tire at a point forwardly of and below the uppermost portion of the tire, substantial advantages result.

In the first place the harder the hand lever 46 is pulled rearwardly the tighter the driving engagement. In the second place the direction of rotation of the friction pulley 32 causes it to tend to climb higher on the tire and, consequently, into tighter driving engagement. This will counteract any tendency for the friction pulley and motor to jump forwardly out of engagement.

Although only one form of the invention has been shown and described, it is obvious that various changes and modifications may be made without departing from the spirit of the invention, and all of such changes are contemplated as may come within the scope of the claims.

What I claim is:

1. In a motor bicycle having a frame and having a tire-equipped rear driving wheel, a motor driven tire-engaging friction pulley, and slidable means supporting said pulley on the frame for movement in a direction extending longitudinally of the bicycle, said slidable means being so located that the pulley is directed into driving engagement with the tire at a location forwardly of and below the uppermost portion of said tire so that the rotation of the pulley constantly urges said pulley into tighter engagement with the tire during normal operation.

2. In a motor bicycle having a frame and having a tire-equipped rear driving wheel, a motor driven tire-engaging friction pulley, a rod connected to the frame to extend in a direction longitudinally of the bicycle, a sleeve slidable longitudinally on said rod, and means for supporting said friction pulley on said sleeve, said rod being positioned so that the friction pulley is directed into driving engagement with the tire forwardly of and below the uppermost portion of the tire periphery.

3. In a motor bicycle having a frame and having a tire-equipped rear driving wheel, a motor having a driven tire-engaging friction pulley projecting therefrom, and slidable means supporting said motor on the frame for movement in a direction extending longitudinally of the bicycle, said slidable means being so located that the pulley is directed into driving engagement with the tire at a location forwardly of and below the uppermost portion of the tire so that the rotation of the pulley constantly urges said pulley into tighter engagement with the tire during normal operation.

4. In a motor bicycle having a frame formed with a rear fork and having a rear tire-equipped driving wheel, a motor having a driven tire-engaging friction pulley projecting therefrom, a rod rigidly supported on said rear fork on each side of the rear wheel, said rods extending in a general direction longitudinally of the bicycle, and sleeves slidable longitudinally on said rods, said sleeves being connected to said motor to support the same, said rods being so positioned that upon movement of the sleeves in a rearward direction the friction pulley is directed into driving engagement with the tire forwardly of and below the uppermost portion of the tire periphery.

5. In a motor bicycle having a frame and having a tire-equipped rear driving wheel, a motor driven tire-engaging friction pulley, a rod connected to the frame to extend in a direction longitudinally of the bicycle, a sleeve slidable longitudinally on said rod, and means for supporting said friction pulley on said sleeve, said rod being slightly rearwardly and downwardly inclined and so positioned that when the sleeve is moved rearwardly on the rod the pulley is directed into driving engagement with the tire at a location forwardly of and below the uppermost portion of the tire periphery so that the rotation of the pulley constantly urges said pulley into tighter engagement with the tire during normal operation.

GEORGE F. MURPHY.